(12) United States Patent
Okamoto (10) Patent No.: US 12,449,300 B2
(45) Date of Patent: Oct. 21, 2025

(54) PHOTOELECTRIC CONVERSION APPARATUS HAVING MEASUREMENT CIRCUITS, IMAGING APPARATUS, CONTROL METHOD, AND STORAGE MEDIUM

(71) Applicant: CANON KABUSHIKI KAISHA, Tokyo (JP)

(72) Inventor: Satoshi Okamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 17/933,286

(22) Filed: Sep. 19, 2022

(65) Prior Publication Data

US 2023/0094311 A1 Mar. 30, 2023

(30) Foreign Application Priority Data

Sep. 24, 2021 (JP) ................................. 2021-155376

(51) Int. Cl.
*G01J 1/44* (2006.01)

(52) U.S. Cl.
CPC ......... *G01J 1/44* (2013.01); *G01J 2001/4466* (2013.01)

(58) Field of Classification Search
CPC .... G01J 1/44; G01J 1/4228; G01J 2001/4466; G01J 2001/442; G01J 1/18
See application file for complete search history.

(56) References Cited

U.S. PATENT DOCUMENTS

| | | | | |
|---|---|---|---|---|
| 11,815,394 B2* | 11/2023 | Numata | ............... | H04N 25/771 |
| 2011/0050969 A1* | 3/2011 | Nishihara | ............... | H10F 39/18 |
| | | | | 348/308 |
| 2011/0080510 A1* | 4/2011 | Nishihara | .............. | H04N 25/65 |
| | | | | 348/308 |
| 2011/0127415 A1* | 6/2011 | Kanter | .................. | G01D 18/00 |
| | | | | 250/214 R |
| 2015/0163429 A1* | 6/2015 | Dai | ...................... | H04N 25/581 |
| | | | | 348/295 |
| 2016/0219234 A1* | 7/2016 | Nishihara | ............ | H04N 25/773 |
| 2018/0164446 A1* | 6/2018 | Zhao | ........................ | G01J 1/46 |
| 2018/0328783 A1* | 11/2018 | Nishihara | ............ | H04N 25/618 |

(Continued)

FOREIGN PATENT DOCUMENTS

| | | |
|---|---|---|
| JP | 2018201155 A | 12/2018 |
| JP | 2020022136 A | 2/2020 |
| WO | 2019150785 A1 | 8/2019 |

*Primary Examiner* — Twyler L Haskins
*Assistant Examiner* — John H Morehead, III
(74) *Attorney, Agent, or Firm* — Canon U.S.A., Inc. IP Division (57) ABSTRACT

A photoelectric conversion apparatus includes a pixel including a photoelectric conversion circuit configured to output a signal corresponding to photon incidence. The photoelectric conversion apparatus further includes a first measurement circuit, an addition circuit, and a second measurement circuit. The first measurement circuit is configured to measure the signal output from the pixel. The addition circuit is configured to add measured values of a plurality of the first measurement circuits. The second measurement circuit is configured to measure a time from when each of the plurality of first measurement circuits starts measuring the signal to when the measured values added by the addition circuit reach a first threshold value.

15 Claims, 7 Drawing Sheets

(56) References Cited

U.S. PATENT DOCUMENTS

| | | | |
|---|---|---|---|
| 2020/0064186 A1* | 2/2020 | Ta | G01S 17/10 |
| 2020/0109987 A1* | 4/2020 | Willassen | G01J 1/46 |
| 2020/0137373 A1* | 4/2020 | Iguchi | G01S 17/894 |
| 2020/0240837 A1* | 7/2020 | Ota | H04N 25/77 |
| 2020/0326414 A1* | 10/2020 | Delic | G01J 1/44 |
| 2020/0370955 A1* | 11/2020 | Hennecke | G01S 17/42 |
| 2021/0025757 A1* | 1/2021 | Yamamoto | G01J 3/4406 |
| 2021/0156972 A1* | 5/2021 | Droz | G01J 1/44 |
| 2021/0223098 A1* | 7/2021 | Ledvina | G01J 1/44 |
| 2021/0372852 A1* | 12/2021 | Baba | G01J 11/00 |
| 2021/0389176 A1* | 12/2021 | Yamazaki | G01J 1/44 |
| 2023/0095243 A1* | 3/2023 | Numata | G16H 30/00 348/308 |
| 2023/0098566 A1* | 3/2023 | Numata | H04N 5/32 348/207.99 |

\* cited by examiner

PHOTOELECTRIC CONVERSION APPARATUS HAVING MEASUREMENT CIRCUITS, IMAGING APPARATUS, CONTROL METHOD, AND STORAGE MEDIUM

BACKGROUND

Technical Field

One disclosed aspect of the embodiments relates to a photoelectric conversion apparatus that outputs a signal corresponding to incident photons.

Description of the Related Art

Recently, a photoelectric conversion apparatus has been discussed in which the number of photons incoming and incident on an avalanche photo diode is digitally counted and the counted number is output from a pixel as a digital signal through photoelectric conversion.

United States Patent Application Publication No. 2015/0163429 discusses a configuration including a time counter configured to measure a time in addition to a photon counter configured to count photons. The time counter measures the time from when the photon counter starts counting photons to when the counted number of photons reaches a predetermined value, and calculates a pixel value based on the measured time.

However, in the configuration discussed in United States Patent Application Publication No. 2015/0163429, the photon counter and the time counter are provided for each pixel, which causes an increase in circuit size.

SUMMARY

One embodiment is directed to a technique for appropriately performing pixel readout processing while suppressing an increase in circuit size.

According to an aspect of the disclosure, a photoelectric conversion apparatus including a pixel including a photoelectric conversion circuit configured to output a signal corresponding to photon incidence includes a first measurement circuit, an addition circuit, and a second measurement circuit. The first measurement circuit is configured to measure the signal output from the pixel. The addition circuit is configured to add measured values of a plurality of the first measurement circuits. The second measurement circuit is configured to measure a time from when each of the plurality of first measurement circuits starts measuring the signal to when the measured values added by the addition circuit reach a first threshold value.

Further features of the disclosure will become apparent from the following description of exemplary embodiments with reference to the attached drawings.

DESCRIPTION OF THE EMBODIMENTS

Exemplary embodiments of the disclosure will be described in detail below. Each of the exemplary embodiments described below is merely an example for implementing the disclosure and can be modified or changed as appropriate based on a configuration of an apparatus to which any of the exemplary embodiments is applied and various conditions, and the disclosure is not limited to the following exemplary embodiments. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include digital and/or analog circuits. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above.

Figure 1:
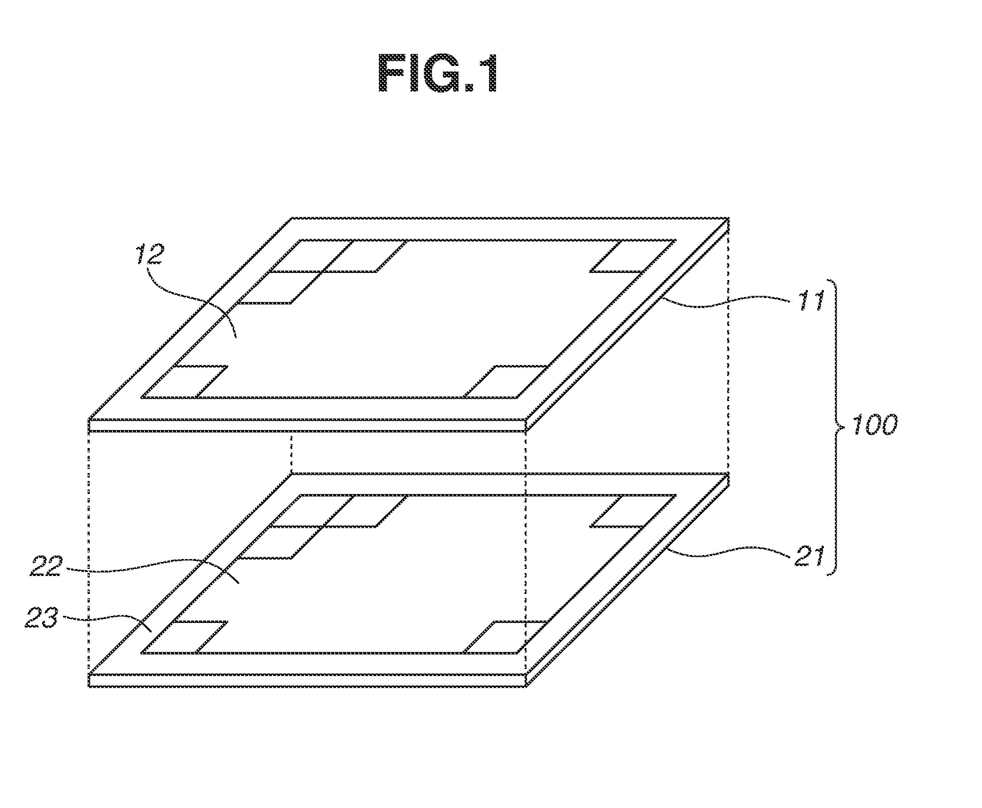
FIG. 1 is a diagram illustrating an example of a configuration of a photoelectric conversion apparatus.

FIG. 1 illustrates an example of a configuration of a photoelectric conversion apparatus 100 according to a first exemplary embodiment.

The photoelectric conversion apparatus 100 includes two chips, a sensor chip 11 and a circuit chip 21, which are stacked and electrically connected to each other. The sensor chip 11 includes a pixel area 12. The circuit chip 21 includes a pixel circuit area 22 for processing respective signals detected by a plurality of pixels 201 (refer to FIG. 2) in the pixel area 12 in parallel, and a peripheral circuit area 23 for reading out the signals from the pixel circuit area 22 and controlling the pixel circuit area 22.

Figure 2:
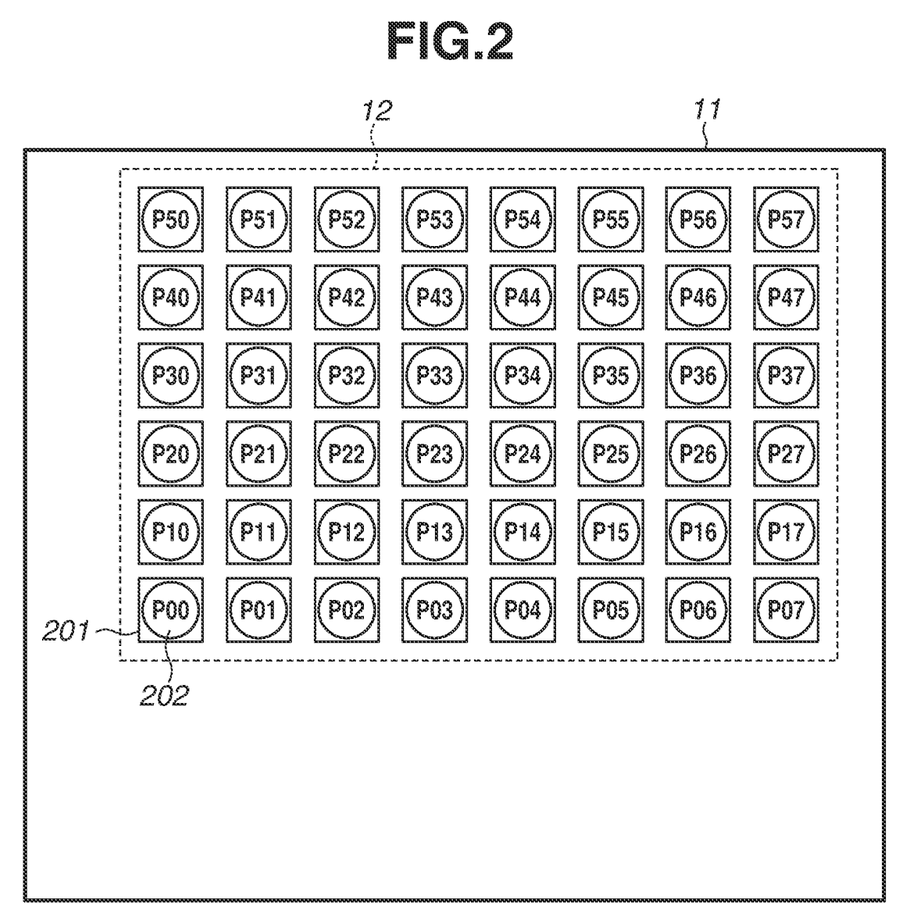
FIG. 2 is a diagram illustrating an example of a sensor chip of the photoelectric conversion apparatus.

FIG. 2 illustrates an example of a configuration of the sensor chip 11 according to the present exemplary embodiment.

The pixel area 12 of the sensor chip 11 includes the plurality of pixels 201 arranged in a two-dimensional array with a plurality of rows and columns. Each of the plurality of pixels 201 includes a photoelectric conversion unit or circuit 202 including an avalanche photo diode (APD) that outputs a signal corresponding to incident photons. More specifically, FIG. 2 illustrates 48 pixels, among the plurality of pixels 201, arranged in six rows from the zeroth row to the fifth row and eight columns from the zeroth column to the seventh column, together with codes each indicating the corresponding row number and column number. For example, the pixel arranged in the first row and the fourth column is indicated with the code "P14". The number of rows and columns of the pixel array that forms the pixel area 12 is not particularly limited.

Figure 3:
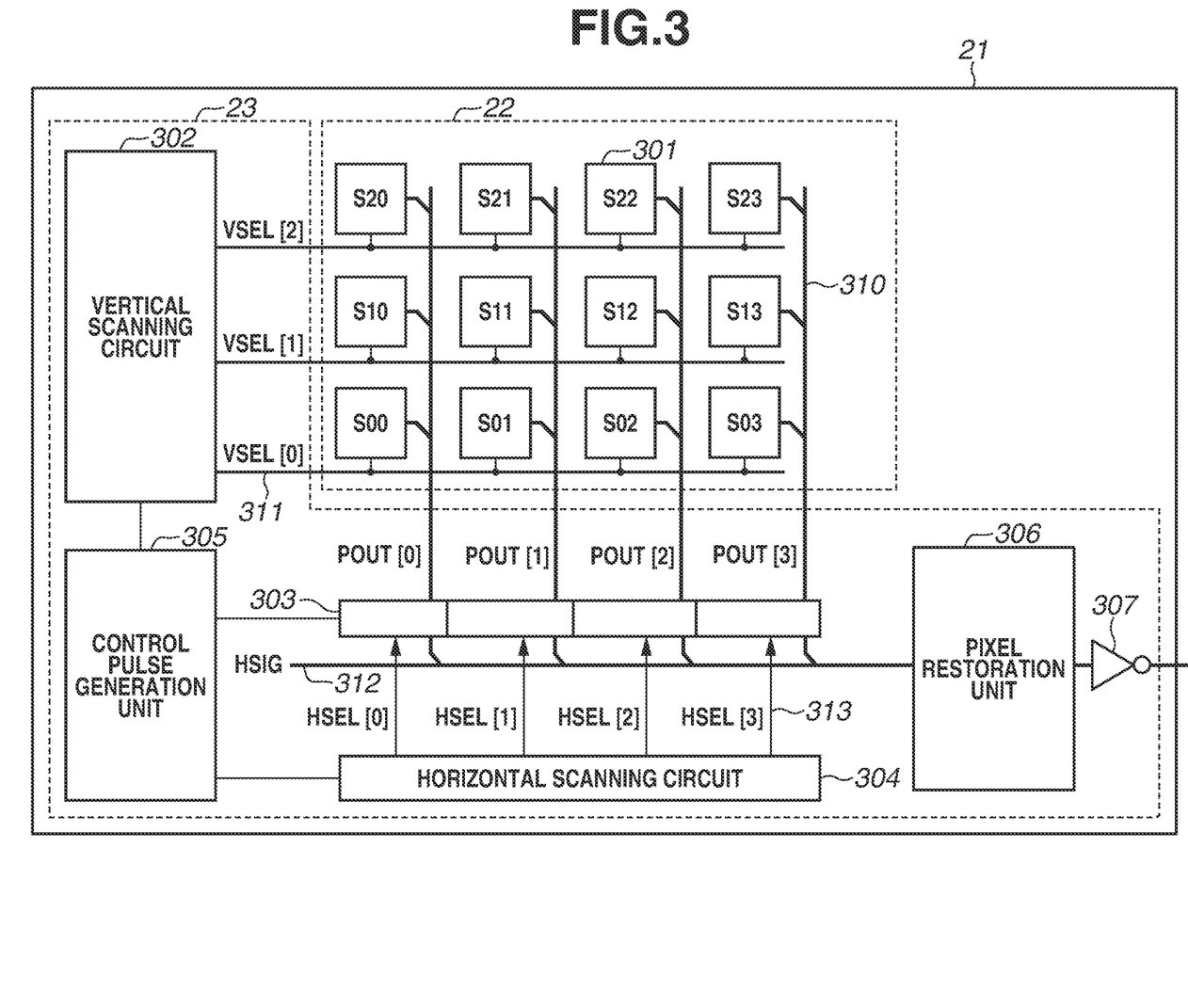
FIG. 3 is a diagram illustrating an example of a circuit chip of the photoelectric conversion apparatus.

FIG. 3 illustrates an example of a configuration of the circuit chip 21 according to the present exemplary embodiment. The circuit chip 21 includes the pixel circuit area 22 and the peripheral circuit area 23.

The pixel circuit area 22 includes a plurality of signal processing units or circuits 301 arranged in a two-dimensional array with a plurality of rows and columns. FIG. 3 illustrates 12 signal processing circuits, among the plurality of signal processing circuits 301, arranged in three rows from the zeroth row to the second row and four columns from the zeroth column to the third column, together with codes each indicating the corresponding row number and column number. For example, the signal processing circuit arranged in the second row and the second column is indicated with the code "S22". The number of rows and columns of the signal processing circuit array that forms the pixel circuit area 22 is not particularly limited. Each of the plurality of signal processing circuits 301 is connected to four pixels among the plurality of pixels 201. However, the number of pixels connected to each of the plurality of signal processing circuits 301 is not particularly limited. Each of the plurality of signal processing circuits 301 includes photon counters 403 (first measurement circuits) (refer to FIG. 4) each configured to measure the number of photons, and a time counter 407 (a second measurement circuit) (refer to FIG. 4) configured to measure a time. The photoelectric conversion apparatus 100 according to the present exemplary embodiment has a configuration in which the photon counters 403 are respectively provided for the plurality of pixels 201, whereas the time counter 407 is shared by a group of pixels among the plurality of pixels 201. More specifically, a group of pixels among the plurality of pixels 201 in the pixel area 12 is regarded as a partial pixel area, and the photon counters 403 are respectively provided for the plurality of pixels 201, whereas the time counter 407 is provided for each partial pixel area. Such a configuration makes it possible to reduce the circuit size. Details thereof will be described below.

The peripheral circuit area 23 includes a vertical scanning circuit 302, column circuits 303, a horizontal scanning circuit 304, a control pulse generation unit or circuit 305, a pixel restoration unit or circuit 306, and a signal output circuit 307. In respective rows of the signal processing circuit array in the pixel circuit area 22, vertical selection lines 311 (VSEL) are arranged extending in a first direction (a horizontal direction in FIG. 3). Each of the vertical selection lines 311 (VSEL) is connected to the corresponding signal processing circuits 301 arranged in the first direction and forms a signal line. The first direction in which the vertical selection lines 311 (VSEL) extend is also referred to as a row direction or a horizontal direction. In the present exemplary embodiment, each of the vertical selection lines 311 (VSEL) is divided into a readout vertical selection line for reading out the signals of the plurality of signal processing circuits 301 in each row, and a reset vertical selection line for resetting the signals of the plurality of signal processing circuits 301 in each row. FIG. 3 illustrates the vertical selection lines 311 (VSEL), together with codes each indicating the corresponding row number. For example, the vertical selection line in the first row is indicated with the code "VSEL [1]". The vertical selection lines 311 (VSEL) in respective rows are connected to the vertical scanning circuit 302. The vertical scanning circuit 302 supplies a vertical selection signal for selectively driving the plurality of signal processing circuits 301 to the plurality of signal processing circuits 301 via the vertical selection lines 311 (VSEL).

In respective columns of the signal processing circuit array in the pixel circuit area 22, vertical signal lines 310 are arranged extending in a second direction (a vertical direction in FIG. 3) that intersects the first direction. Each of the vertical signal lines 310 is connected to the corresponding signal processing circuits 301 arranged in the second direction, and forms a common signal line. The second direction in which the vertical signal lines 310 extend is also referred to as a column direction or a vertical direction. FIG. 3 illustrates the vertical signal lines 310, together with codes each indicating the corresponding column number. For example, the vertical signal line in the third column is indicated with the code "POUT[3]". Each of the vertical signal lines 310 in respective columns includes n-number of signal lines for outputting an n-bit digital signal.

The horizontal scanning circuit 304 supplies a horizontal selection signal for reading out signals from the column circuits 303, to the column circuits 303. The horizontal scanning circuit 304 supplies the horizontal selection signal to the column circuits 303 in respective columns via horizontal selection lines 313 (HSEL). When receiving the horizontal selection signal from the horizontal scanning circuit 304, each of the column circuits 303 outputs the signal stored therein to the pixel restoration circuit 306 via a horizontal output line 312 (HSIG). FIG. 3 illustrates the horizontal selection lines 313 (HSEL), together with codes each indicating the corresponding column number. For example, the horizontal selection line in the third column is indicated with the code "HSEL[3]".

The control pulse generation circuit 305 supplies control pulse signals for controlling operations of the vertical scanning circuit 302, the horizontal scanning circuit 304, and the column circuits 303, and timings of the operations. At least part of the control pulse signals for controlling the operations of the vertical scanning circuit 302, the horizontal scanning circuit 304, and the column circuits 303 and the timings of the operations may be supplied from the outside of the photoelectric conversion apparatus 100. The pixel restoration circuit 306 divides the measured values of the photon counters 403 by the measured value of the time counter 407, thereby calculating a pixel value and outputting the pixel value to the signal output circuit 307. The signal output circuit 307 outputs a signal corresponding to the pixel signal, as an output signal SOUT of the photoelectric conversion apparatus 100. Alternatively, the configuration may be such that the measured time of the time counter 407 is directly output, i.e., the pixel restoration circuit 306 is provided outside the photoelectric conversion apparatus 100.

Figure 4:
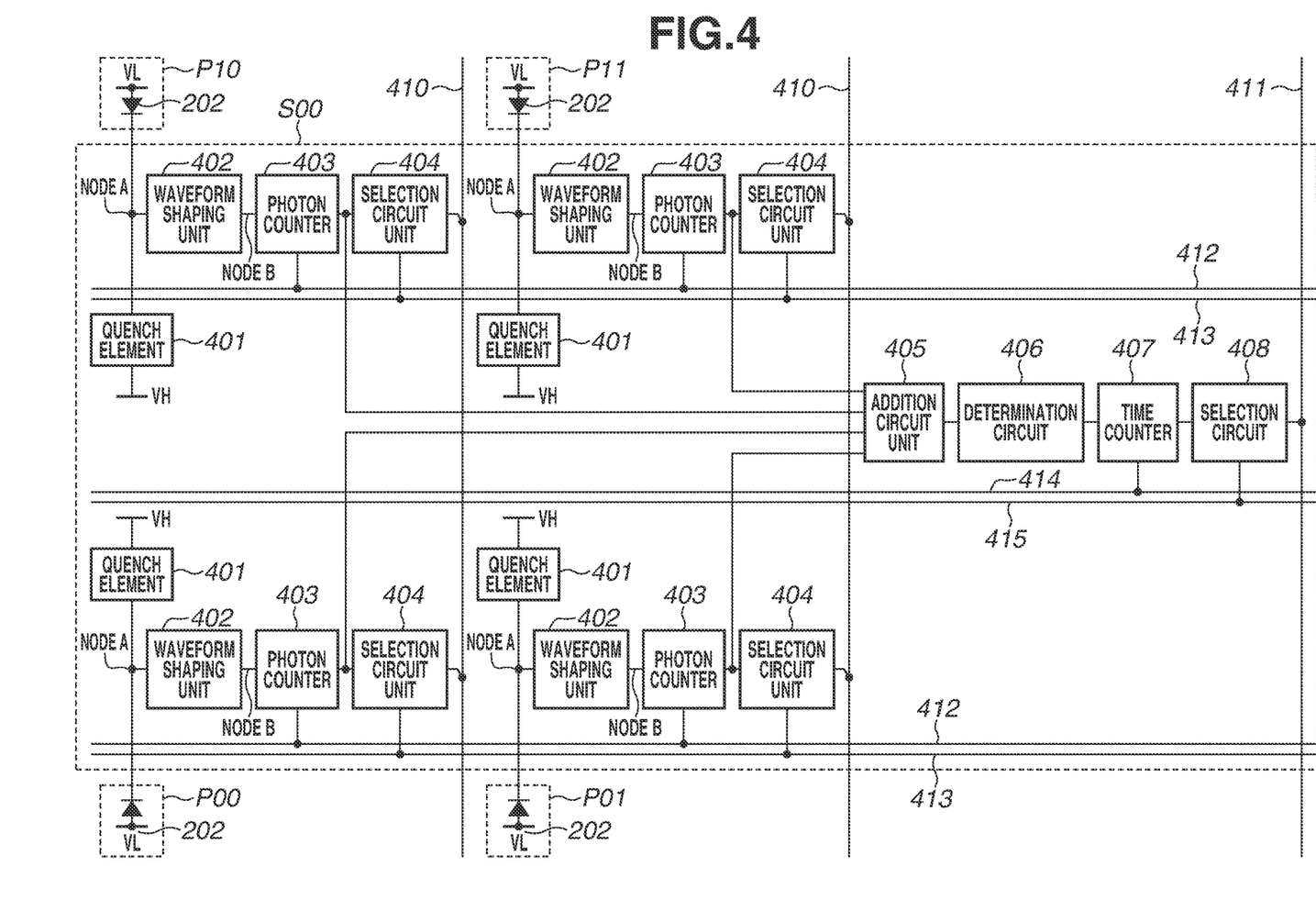
FIG. 4 is a diagram illustrating an example of an equivalent circuit illustrating a pixel and a signal processing circuit in the photoelectric conversion apparatus.

FIG. 4 illustrates an example of an equivalent circuit and a block diagram illustrating the plurality of pixels 201 illustrated in FIG. 2 and the plurality of signal processing circuits 301 illustrated in FIG. 3, according to the present exemplary embodiment. In this example, a group of pixels among the plurality of pixels 201 is regarded as a partial pixel area, and the photon counters 403 are respectively provided for the plurality of pixels 201, whereas the time counter 407 is provided for each partial pixel area.

Each of the plurality of pixels 201 in the sensor chip 11 includes the photoelectric conversion circuit 202 (hereinafter also referred to as the APD 202). When light is incident on the APD 202, a charge pair corresponding to the incident light is generated by photoelectric conversion. A voltage VL (a first voltage) is supplied to an anode of the APD 202. A voltage VH (a second voltage) higher than the voltage VL supplied to the anode is supplied to a cathode of the APD 202. A reverse bias voltage enabling the APD 202 to perform an avalanche multiplication operation is supplied to the anode and the cathode. In such a voltage supply state, the charge generated by the incident light causes the avalanche multiplication, thereby generating an avalanche current.

In a case where the reverse bias voltage is supplied, Geiger mode and linear mode are used. In the Geiger mode, the APD 202 is operated in a state where a potential difference between the anode and the cathode is greater than a breakdown voltage. In the linear mode, the APD 202 is operated in a state where the potential difference between the anode and the cathode is around the breakdown voltage, or the breakdown voltage or less. The APD 202 operated in the Geiger mode is called a single photon avalanche diode (SPAD). For example, the voltage VL (the first voltage) is −30 V and the voltage VH (the second voltage) is 1 V.

Each of the plurality of signal processing circuits 301 in the circuit chip 21 includes quench elements 401, waveform shaping units or circuits 402, the photon counters 403, selection circuit units or circuits 404, an addition circuit unit or circuit 405, a determination circuit 406, and the time counter 407.

Each of the quench elements 401 is connected to a power supply that supplies the voltage VH, and to the APD 202. Each of the quench elements 401 has a function of replacing an avalanche current change in the APD 202 with a voltage signal. Each of the quench elements 401 serves as a load circuit (a quench circuit) at the time of signal multiplication by the avalanche multiplication. Each of the quench elements 401 reduces the voltage to be supplied to the APD 202 to suppress the avalanche multiplication (which is referred to as a quench operation).

Each of the waveform shaping circuits 402 shapes a potential change at the cathode of the APD 202 obtained at the time of photon detection, and outputs pulse signals. Each of the waveform shaping circuits 402 uses, for example, an inverter circuit or a buffer circuit.

Each of the photon counters 403 measures the number of photons incident on the corresponding pixel 201. More specifically, each of the photon counters 403 counts the pulse signals output from the corresponding waveform shaping circuit 402 up to, for example, a first threshold value Cx. When a predetermined control signal is supplied to each of the photon counters 403 via a control line 412, each of the photon counters 403 resets the counted number. Each of the selection circuits 404 switches between electrical connection and disconnection of the corresponding photon counter 403 and a signal line 410, based on the vertical selection signal supplied from the vertical scanning circuit 302 illustrated in FIG. 3 via a control line 413. Each of the selection circuits 404 includes, for example, a buffer circuit for outputting signals. The addition circuit 405 adds up the measured values of the four photon counters 403 respectively corresponding to the plurality of pixels included in the partial pixel area, and outputs a value obtained by the addition to the determination circuit 406. The determination circuit 406 determines whether the value output from the addition circuit 405 reaches the first threshold value Cx. The time counter 407 counts a time. The counted time is reset by a control signal supplied via a control line 414. When the reset is canceled, the time counter 407 starts counting. If the value output from the addition circuit 405 does not reach the first threshold value Cx even after the measured value of the time counter 407 exceeds a predetermined time (e.g., even after the measured value reaches 10 clocks), the time counter 407 is stopped.

In this case, the measured value of each of the photon counters 403 is output. Further, the time counter 407 is stopped by a control signal supplied from the determination circuit 406. A selection circuit 408 switches between electrical connection and disconnection of the time counter 407 and a signal line 411, based on a control signal supplied from the vertical scanning circuit 302 illustrated in FIG. 3 via a control line 415. The selection circuit 408 includes, for example, a buffer circuit for outputting signals.

In the example of FIG. 4, the four photon counters 403 are connected to the one time counter 407. This configuration makes it possible to reduce the circuit size, compared to a configuration in which one photon counter is connected to one time counter. While in the present exemplary embodiment, the four photon counters 403 are connected to the one time counter 407, the configuration is not limited thereto. However, as the number of the photon counters 403 connected to the one time counter 407 increases, the possibility of pixel saturation increases.

Figure 5:
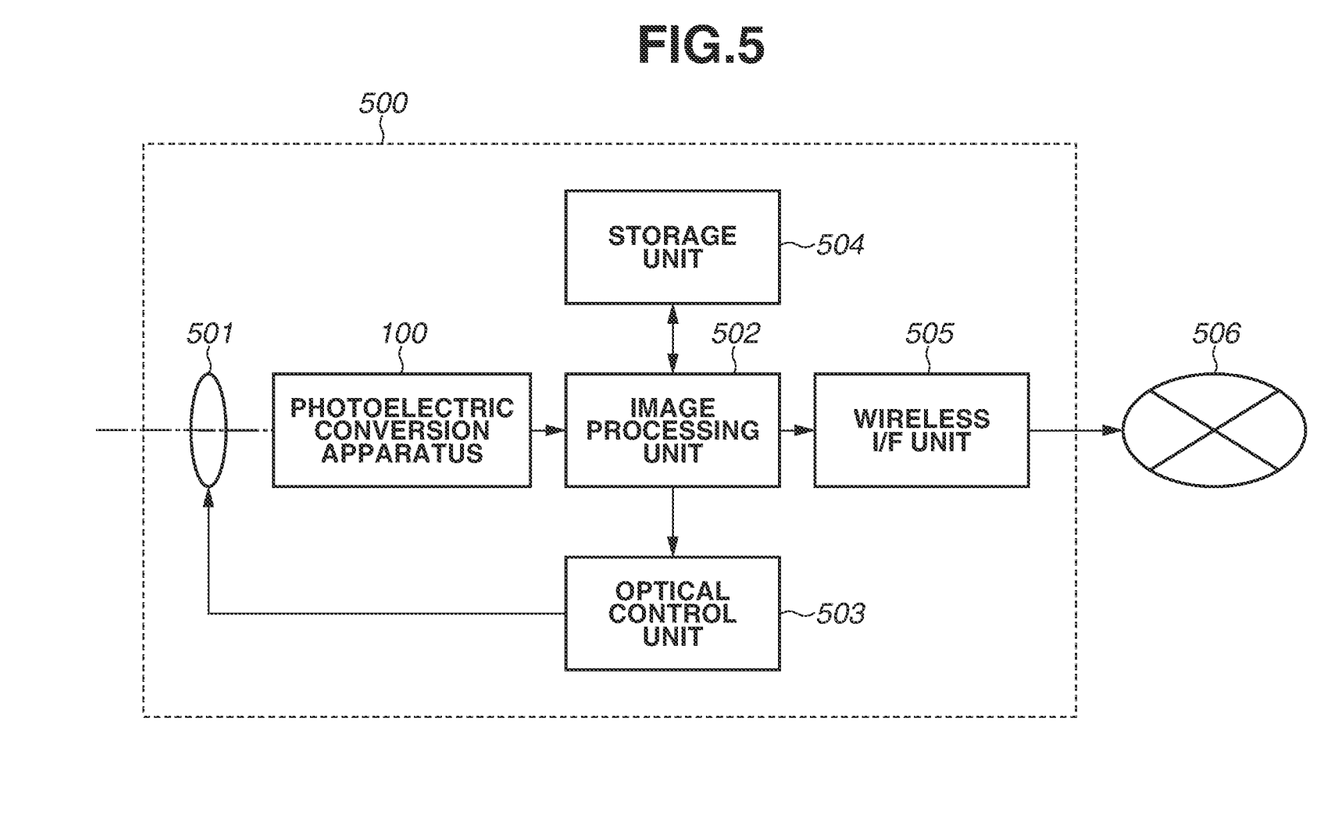
FIG. 5 is a block diagram illustrating an example of a functional configuration of an imaging apparatus including the photoelectric conversion apparatus.

FIG. 5 is a block diagram of an imaging apparatus 500 according to the present exemplary embodiment.

The imaging apparatus 500 is an imaging apparatus including the photoelectric conversion apparatus 100. The imaging apparatus 500 includes a lens 501, an image processing unit or circuit 502, an optical control unit or circuit 503, a storage unit or circuit 504, a wireless interface (I/F) unit or circuit 505 serving as a communication unit or circuit.

The lens 501 forms an optical image of a subject and causes the formed optical image to be incident on an imaging surface of the photoelectric conversion apparatus 100. The lens 501 includes a focus lens, a zoom lens, and an aperture. The photoelectric conversion apparatus 100 captures the optical image formed by the lens (the optical system) 501. A signal read out from the photoelectric conversion apparatus 100 is output to the image processing circuit 502. The image processing circuit 502 performs processing on the signal output from the photoelectric conversion apparatus 100, such as signal rearrangement, defective pixel correction, noise reduction, color conversion, white balance correction, gamma correction, and data compression, thereby generating an image. The image processing circuit 502 has a built-in central processing unit (CPU) serving as a computer, and functions as a control circuit that controls the operation of each component of the imaging apparatus 500 based on a computer program stored in a memory serving as a storage medium. The optical control circuit 503 controls the focus lens, the zoom lens, and the aperture that are included in the lens 501. A recording medium (not illustrated) is attached to the storage circuit 504, and stores the image output from the image processing circuit 502. For example, a memory card is used as the recording medium. Alternatively, a hard disk may be used as the recording medium. The wireless I/F circuit 505 serving as the communication circuit outputs the image signal generated by the image processing circuit 502, to the outside of the imaging apparatus 500. A network 506 includes a plurality of routers, switches, and cables that meets a communication standard such as Ethernet®, and a client controls the imaging apparatus 500 via the network 506.

A second exemplary embodiment will be described. A configuration according to the present exemplary embodiment is the same as the configuration according to the first exemplary embodiment except the configuration of the plurality of signal processing circuits 301.

Figure 6:
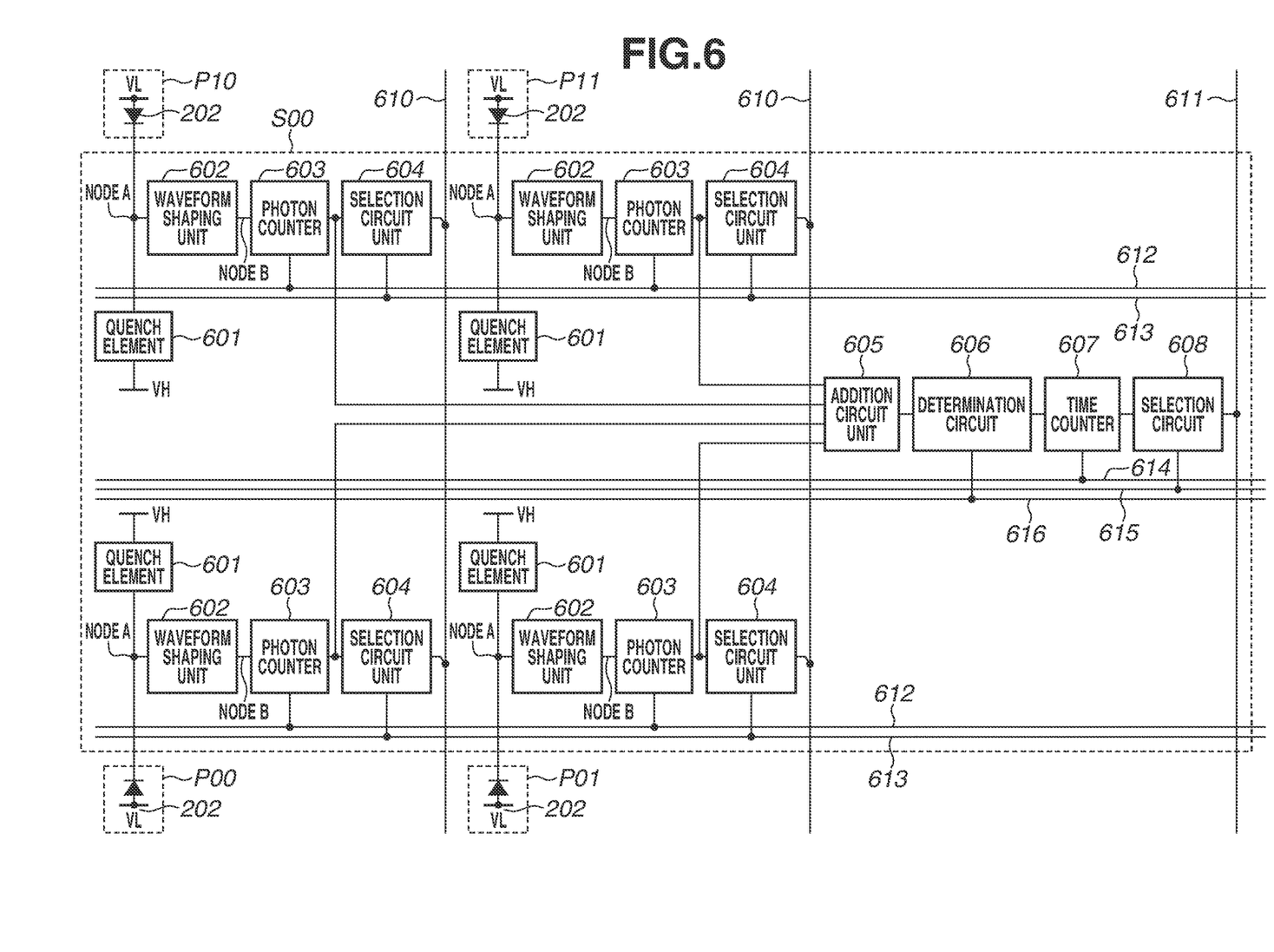
FIG. 6 is a diagram illustrating another example of the equivalent circuit illustrating the pixel and the signal processing circuit in the photoelectric conversion apparatus.

FIG. 6 illustrates an example of an equivalent circuit and a block diagram illustrating the plurality of pixels 201 illustrated in FIG. 2 and the plurality of signal processing circuits 301 in FIG. 3, according to the present exemplary embodiment.

Each of the plurality of pixels 201 in the sensor chip 11 includes the photoelectric conversion circuit 202 (the APD 202). When light is incident on the APD 202, a charge pair corresponding to the incident light is generated by photoelectric conversion. A voltage VL (a first voltage) is supplied to an anode of the APD 202. A voltage VH (a second voltage) higher than the voltage VL supplied to the anode is supplied to a cathode of the APD 202. A reverse bias voltage enabling the APD 202 to perform avalanche multiplication is supplied to the anode and the cathode. In such as voltage supply state, the charge generated by the incident light causes the avalanche multiplication, thereby generating an avalanche current.

In a case where the reverse bias voltage is supplied, the Geiger mode and the linear mode are used. In the Geiger mode, the APD 202 is operated in a state where the potential difference between the anode and the cathode is greater than the breakdown voltage. In the linear mode, the APD 202 is operated in a state where the potential difference between the anode and the cathode is around the breakdown voltage, or the breakdown voltage or less. The APD 202 operated in the Geiger mode is called the SPAD. For example, the voltage VL (the first voltage) is −30 V and the voltage VH (the second voltage) is 1 V.

Each of the plurality of signal processing circuits 301 in the circuit chip 21 includes quench elements 601, waveform shaping units or circuits 602, photon counters 603, selection circuit units or circuits 604, an addition circuit unit or circuit 605, a determination circuit 606, and a time counter 607.

Each of the quench elements 601 is connected to a power supply that supplies the voltage VH, and to the APD 202. Each of the quench elements 601 has a function of replacing an avalanche current change in the APD 202 with a voltage signal. Each of the quench elements 601 serves as a load circuit (a quench circuit) at the time of signal multiplication by the avalanche multiplication. Each of the quench elements 601 reduces the voltage to be supplied to the APD 202 to suppress the avalanche multiplication (which is referred to as a quench operation).

Each of the waveform shaping circuits 602 shapes the potential change of the cathode of the APD 202 obtained at the time of photon detection, and outputs pulse signals. Each of the waveform shaping circuits 602 uses, for example, an inverter circuit or a buffer circuit.

Each of the photon counters 603 measures the number of photons incident on the corresponding pixel 201. More specifically, each of the photon counters 603 counts the pulse signals output from the corresponding waveform shaping circuit 602 up to, for example, the first threshold value Cx. Each of the photon counters 603 resets the counted number when a predetermined control signal is supplied thereto via a control line 612. Each of the selection circuits 604 switches between electrical connection and disconnection of the corresponding photon counter 603 and a signal line 610, based on the vertical selection signal supplied from the vertical scanning circuit 302 illustrated in FIG. 3 via a control line 613. Each of the selection circuits 604 includes, for example, a buffer circuit for outputting signals. The addition circuit 605 adds up the measured values of the photon counters 603 connected to the pixels having the codes P00, P10, and P11 via the corresponding waveform shaping circuits 602, and outputs a value obtained by adding the measured values of the photon counters 603, to the determination circuit 606. The determination circuit 606 determines whether the value output from the addition circuit 605 reaches the first threshold value Cx. The determination circuit 606 can change the first threshold value Cx via a signal line 616. For example, lowering the first threshold value Cx reduces the possibility of saturation of the output of each of the photon counters 603, but increases the noise in the image.

The first threshold value Cx can also be changed via a control line 615. When the first threshold value Cx is reached, a control signal is output to the time counter 607. The time counter 607 counts a time. The counted time is reset by a control signal supplied via a control line 614. When the reset is canceled, the time counter 607 starts counting. Further, the time counter 607 is stopped by a control signal supplied from the determination circuit 606. A selection circuit 608 switches between electrical connection and disconnection of the time counter 607 and a signal line 611, based on a control signal supplied from the vertical scanning circuit 302 illustrated in FIG. 3 via the control line 615. The selection circuit 608 includes, for example, a buffer circuit for outputting signals.

In the configuration according to the first exemplary embodiment, the measured values of all the photon counters 403 included in each of the plurality of signal processing circuits 301 are output to the addition circuit 405. On the other hand, in the configuration according to the present exemplary embodiment, the measured value of part of the photon counters 603 is not output to the addition circuit 605. This configuration makes it possible to reduce the circuit size of the addition circuit 605. However, with the configuration according to the present exemplary embodiment, the possibility of saturation of the output value of the photon counter that is not output to the addition circuit 605 increases. In a case where the saturation occurs, increasing the first threshold value Cx in the determination circuit 606 can suppress the saturation. In addition, the saturation can be suppressed by a configuration in which the photon counter that does not output the measured value to the addition circuit 605 is the photon counter corresponding to one of pixels having the same spectral sensitivity in each of the plurality of signal processing circuits 301, for example, the photon counter corresponding to one of two green pixels in a Bayer array.

<Flowchart>

Figure 7:
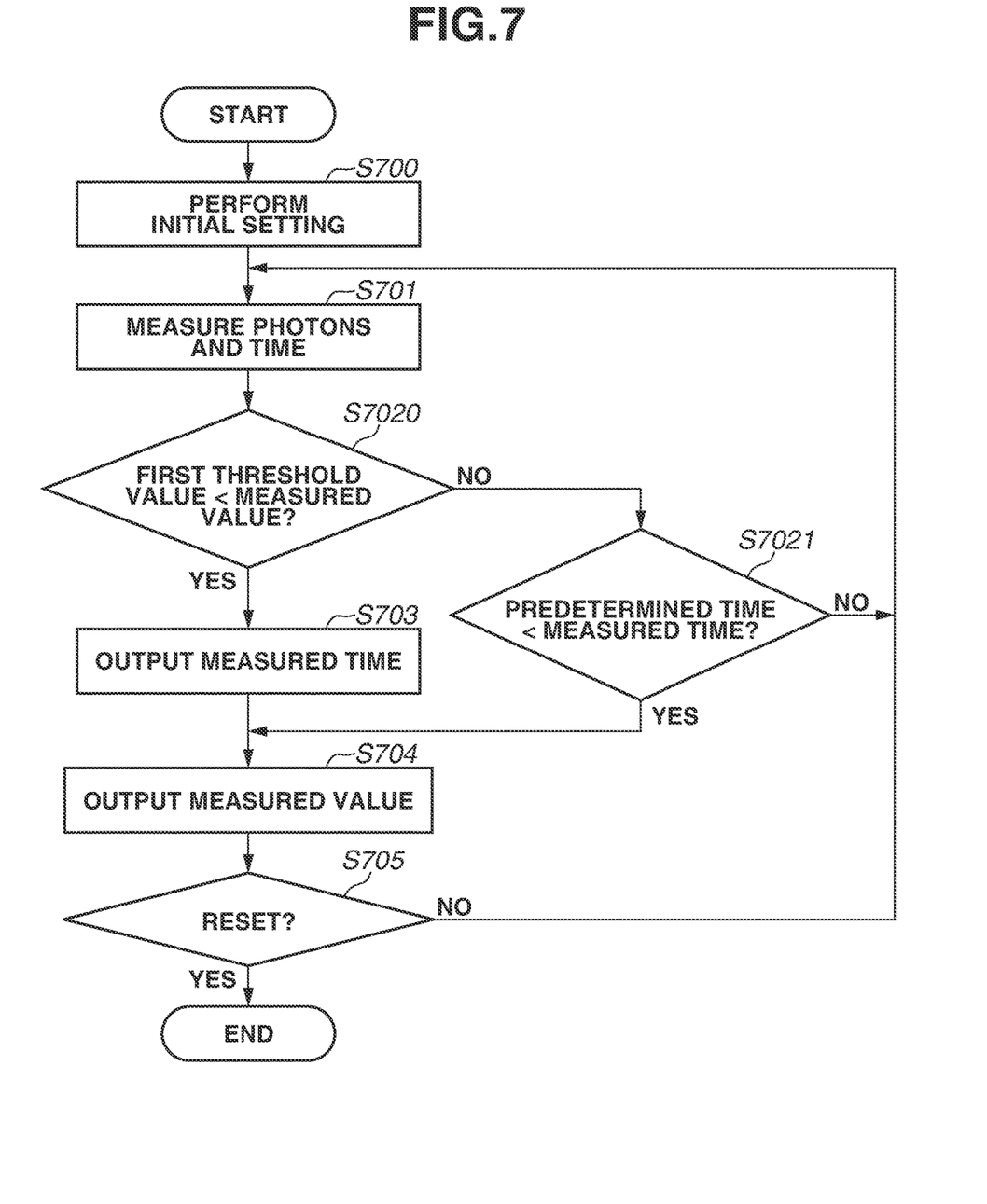
FIG. 7 is a flowchart illustrating an example of an operation of the photoelectric conversion apparatus.

FIG. 7 is a flowchart illustrating an operation performed by the photoelectric conversion apparatus 100 according to the first or second exemplary embodiment. In the following description, the prefix "S" is given to each process (step) number. In step S700, the addition circuit 605 is initially connected to at least two or all of the plurality of pixels 201 in the partial pixel area. In step S701, the addition circuit 605 and the time counter 607 start measuring the photons and the time respectively. In step S7020, the determination circuit 606 determines whether the total number of photons measured at the connected pixels exceeds the first threshold value Cx. If the total number of photons exceeds the first threshold value Cx (YES in step S7020), the processing proceeds to step S703. If the total number of photons does not exceed the first threshold value Cx (NO in step S7020), the processing proceeds to step S7021. In step S7021, the determination circuit 606 determines whether the time elapsing from the start of the photon measurement exceeds a predetermined time. If the determination circuit 606 determines that the time exceeds the predetermined time (YES in step S7021), the processing proceeds to step S704. If the determination circuit 606 determines that the time does not exceed the predetermined time (NO in step S7021), the processing returns to step S701 to continue measuring the photons. In step S703, the time counter 407 outputs the time when the total number of photons has reached the first threshold value Cx. In step S704, the addition circuit 605 or each of the photon counters 603 outputs the measured number of photons (the measured value). In step S705, the determination circuit 606 determines whether to perform the reset. If no end instruction is issued (NO in step S705), the processing returns to step S701 to continue the measurement. If an end instruction is issued (YES in step S705), the processing ends.

In the exemplary embodiments, the example of applying a digital camera as the imaging apparatus 500 has been described. However, examples of the imaging apparatus 500 include electronic devices having an imaging function, such as a digital movie camera, a smartphone with a camera, a tablet computer with a camera, an on-vehicle camera, a drone camera, a camera mounted on a robot, and a network camera.

While the first and second exemplary embodiments have been described in detail above, exemplary embodiments of the disclosure are not limited thereto, and various variations can be made based on the gist of the disclosure and shall not be excluded from the scope of the disclosure.

A computer program for implementing a part or all of the control operations according to the above-described exemplary embodiments may be supplied to the photoelectric conversion apparatus 100, the imaging apparatus 500, or the like, via a network or various storage media. Then, the program may be read out and executed by a computer (e.g., a CPU or a microprocessor unit (MPU)) in the photoelectric conversion apparatus 100, the imaging apparatus 500, or the like. In this case, the program and the storage medium storing the program are included in the exemplary embodiments of the disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-155376, filed Sep. 24, 2021, which is hereby incorporated by reference herein in its entirety.

What is claimed is:

1. A photoelectric conversion apparatus including a pixel of a plurality of pixels having groups of pixels in partial pixel areas, each pixel including a photoelectric conversion circuit configured to output a signal corresponding to photon incidence, the photoelectric conversion apparatus comprising:
a first measurement circuit configured to measure the signal output from the pixel;
an addition circuit configured to add measured values of a plurality of the first measurement circuits; and
a second measurement circuit configured to measure a time from when each of the plurality of first measurement circuits starts measuring the signal to when the measured values added by the addition circuit reach a first threshold value,
wherein the second measurement circuit is provided for each partial pixel area including a plurality of the pixels having different spectral sensitivity, and
wherein the plurality of first measurement circuits is respectively provided for the plurality of pixels included in the partial pixel area.

2. The photoelectric conversion apparatus according to claim 1, wherein, in a case where the measured values added by the addition circuit have not reached the first threshold value at a time when a predetermined time has elapsed since the start of the signal measurement by each of the plurality of first measurement circuits, the measured value of each of the plurality of first measurement circuits is output.

3. The photoelectric conversion apparatus according to claim 1, wherein the addition circuit adds the measured values of the first measurement circuits that correspond to at least a part of the plurality of pixels included in the partial pixel area.

4. The photoelectric conversion apparatus according to claim 3, wherein the addition circuit adds the measured values of the plurality of first measurement circuits that corresponds to all of the plurality of pixels included in the partial pixel area.

5. The photoelectric conversion apparatus according to claim 1, wherein, in a case where the plurality of pixels included in the partial pixel area includes pixels having same spectral sensitivity, the addition circuit adds the measured value of the first measurement circuit that corresponds to one of the pixels having the same spectral sensitivity.

6. The photoelectric conversion apparatus according to claim 1, wherein, in a case where the plurality of pixels included in the partial pixel area is different in spectral sensitivity from each other, the addition circuit adds the measured value of the first measurement circuit that corresponds to a pixel having highest sensitivity among the plurality of pixels.

7. The photoelectric conversion apparatus according to claim 1, further comprising an output circuit configured to output a measured value of the first measurement circuit corresponding to the pixel, or a value of the measured time of the second measurement circuit.

8. The photoelectric conversion apparatus according to claim 7, wherein the output circuit outputs, among the measured values of the plurality of first measurement circuits respectively corresponding to a plurality of the pixels, the measured values of the first measurement circuits excluding a first measurement circuit having the measured value reaching the first threshold value, and the value of the measured time of the second measurement circuit.

9. The photoelectric conversion apparatus according to claim 7, wherein the output circuit combines the measured values of the plurality of first measurement circuits respectively corresponding to a plurality of the pixels included in a partial pixel area, and the value of the measured time of the second measurement circuit into a single signal, and outputs the single signal.

10. The photoelectric conversion apparatus according to claim 7, wherein, in a case where the value of the measured time of the second measurement circuit reaches a predetermined time, the output circuit outputs the measured values of the plurality of first measurement circuits respectively corresponding to a plurality of the pixels.

11. The photoelectric conversion apparatus according to claim 1, further comprising a signal restoration circuit configured to restore a pixel signal based on the measured values of the plurality of first measurement circuits respectively corresponding to a plurality of the pixels, or a value of the measured time of the second measurement circuit.

12. The photoelectric conversion apparatus according to claim 1, wherein the photoelectric conversion circuit includes an avalanche photo diode configured to detect the photon incidence.

13. An imaging apparatus comprising the photoelectric conversion apparatus according to claim 1.

14. A method for controlling a photoelectric conversion apparatus including a pixel of a plurality of pixels having groups of pixels in partial pixel areas, each pixel including a photoelectric conversion circuit configured to output a signal corresponding to photon incidence, the photoelectric conversion apparatus including a first measurement circuit configured to measure the signal output from the pixel, the method comprising:
 adding measured values of a plurality of the first measurement circuits; and
 measuring, by a second measurement circuit, a time from when each of the plurality of first measurement circuits starts measuring the signal to when the added measured values reach a first threshold value,
 wherein the second measurement circuit is provided for each partial pixel area including a plurality of the pixels having different spectral sensitivity, and
 wherein the plurality of first measurement circuits is respectively provided for the plurality of pixels included in the partial pixel area.

15. A non-transitory computer-readable storage medium storing a program for causing a computer to perform a method for controlling a photoelectric conversion apparatus including a pixel of a plurality of pixels having groups of pixels in partial pixel areas, each pixel including a photoelectric conversion circuit configured to output a signal corresponding to photon incidence, the photoelectric conversion apparatus including a first measurement circuit configured to measure the signal output from the pixel, the method comprising:
 adding measured values of a plurality of the first measurement circuits; and
 measuring, by a second measurement circuit, a time from when each of the plurality of first measurement circuits starts measuring the signal to when the added measured values reach a first threshold value,
 wherein the second measurement circuit is provided for each partial pixel area including a plurality of the pixels having different spectral sensitivity, and
 wherein the plurality of first measurement circuits is respectively provided for the plurality of pixels included in the partial pixel area.

* * * * *